US012773897B2

(12) United States Patent
Kammler et al.

(10) Patent No.: US 12,773,897 B2
(45) Date of Patent: Oct. 27, 2026

(54) ENERGY STORE FLOOR SYSTEM FOR AN ELECTRICALLY DRIVABLE MOTOR VEHICLE

(71) Applicant: Bayerische Motoren Werke Aktiengesellschaft, Munich (DE)

(72) Inventors: Andre Kammler, Osnabrueck (DE); Friedemann Moeller, Munich (DE); Julia Sajko, Munich (DE); Paul Winkler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 272 days.

(21) Appl. No.: 18/701,067

(22) PCT Filed: Oct. 12, 2022

(86) PCT No.: PCT/EP2022/078337
§ 371 (c)(1), (2) Date: Apr. 12, 2024

(87) PCT Pub. No.: WO2023/083547
PCT Pub. Date: May 19, 2023

(65) Prior Publication Data

US 2025/0242678 A1 Jul. 31, 2025

(30) Foreign Application Priority Data

Nov. 9, 2021 (DE) ..................... 10 2021 129 120.8

(51) Int. Cl.
*B60K 1/04* (2019.01)
*H01M 50/242* (2021.01)
(Continued)

(52) U.S. Cl.
CPC ............. *B60K 1/04* (2013.01); *H01M 50/242* (2021.01); *H01M 50/244* (2021.01);
(Continued)

(58) Field of Classification Search
CPC .............. B60K 1/04; B60K 2001/0438; B60K 2001/0472; B60K 2001/0494; H01M 50/249; H01M 50/242; H01M 50/244
See application file for complete search history.

(56) References Cited

U.S. PATENT DOCUMENTS

2009/0226806 A1 9/2009 Kiya
2012/0006607 A1 1/2012 Ohashi
(Continued)

FOREIGN PATENT DOCUMENTS

DE 11 2007 000 474 T5 1/2009
DE 10 2011 107 210 A1 3/2012
(Continued)

OTHER PUBLICATIONS

International Search Report (PCT/ISA/210) issued in PCT Application No. PCT/EP2022/078337 dated Feb. 3, 2023 with English translation (6 pages).
(Continued)

*Primary Examiner* — Edwin A Young
(74) *Attorney, Agent, or Firm* — Crowell & Moring LLP

(57) ABSTRACT

An energy store floor system for an electrically drivable motor vehicle includes a floor structure having respective side sills, to the underside of which is fastened a store housing of an energy store for an electrical drive of the motor vehicle, and having respective profile elements, which are arranged along longitudinal sides of the store housing and are fastened to the underside of the respectively assigned side sill. In order to create an energy store floor system with an improved accident behavior in the event of a side impact, the profile elements are connected to the respectively laterally assigned side sill via respective connection devices, which are detachable from the outside inwards when there is a relative movement, caused by an
(Continued)

accident, of the respective side sill relative to the assigned profile element in the vehicle transverse direction.

7 Claims, 4 Drawing Sheets

(51) Int. Cl.
*H01M 50/244* (2021.01)
*H01M 50/249* (2021.01)

(52) U.S. Cl.
CPC ... *H01M 50/249* (2021.01); *B60K 2001/0438* (2013.01); *B60K 2001/0472* (2013.01); *B60K 2001/0494* (2013.01)

(56) References Cited

U.S. PATENT DOCUMENTS

| | | | | |
|---|---|---|---|---|
| 2017/0217297 | A1* | 8/2017 | Li | B62D 29/008 |
| 2018/0141424 | A1 | 5/2018 | Goettfried et al. | |
| 2018/0208038 | A1 | 7/2018 | Ozawa et al. | |
| 2018/0334022 | A1* | 11/2018 | Rawlinson | B60R 16/04 |
| 2020/0062098 | A1 | 2/2020 | Fukuoka | |
| 2020/0373531 | A1 | 11/2020 | Dupper | |
| 2022/0032758 | A1* | 2/2022 | Kaneko | B62D 21/11 |

FOREIGN PATENT DOCUMENTS

| | | | |
|---|---|---|---|
| EP | 2 468 609 | A2 | 6/2012 |
| EP | 3 326 853 | A1 | 5/2018 |
| EP | 3 741 600 | A1 | 11/2020 |
| KR | 10-2019-0021800 | A | 3/2019 |

OTHER PUBLICATIONS

German-language Written Opinion (PCT/ISA/237) issued in PCT Application No. PCT/EP2022/078337 dated Feb. 3, 2023 with English translation (8 pages).
German-language Search Report issued in German Application No. 10 2021 129 120.8 dated Jul. 7, 2022 with partial English translation (10 pages).
German-language Office Action issued in German Application No. 10 2021 129 120.8 dated Jul. 31, 2023 (4 pages).

* cited by examiner

ENERGY STORE FLOOR SYSTEM FOR AN ELECTRICALLY DRIVABLE MOTOR VEHICLE

BACKGROUND AND SUMMARY

The invention relates to an energy store floor system for an electrically drivable motor vehicle.

In motor vehicles with an electric drive, it is already known for a store housing of an energy store for the electric drive of the motor vehicle to be fastened on the lower side of a floor structure of the motor vehicle body which usually comprises respective side sills and crossmembers which connect the latter. Here, respective profile elements which are fastened on the lower side of the respective assigned side sill usually extend along the longitudinal sides of the store housing. An energy store floor system of this type is already known, for example, from EP 2 468 609 A1.

Here, the profile elements which run on the side of the store housing or from its frame are configured, for example, as extruded profiles and can therefore deform with energy absorption, in particular in the case of a side impact. Energy is preferably to be sufficiently dissipated here before an intrusion into the store housing and the energy store occurs, in order as far as possible to avoid a thermal event.

On account of constricted installation space conditions or weight-reducing measures, however, it can occur in some circumstances that there is not sufficient space to install a sufficiently large profile element which can sufficiently dissipate energy before an intrusion into the store housing with the energy store can occur. Moreover, it can also occur that the main load is input at a location of the vehicle side at which the store housing or the profile element does not run at all, but rather takes place on the laterally assigned side sill, for example, in front of or behind the store housing or the profile element in the vehicle longitudinal direction. It is the case here that damage of the store housing as a result of coupled motion of the profile element by way of the side sill which is loaded due to the accident is to be avoided, which might lead to an intrusion of the profile element into the store housing.

It is therefore an object of the present invention to provide an energy store floor system of the type mentioned at the outset which has an improved accident behavior in the case of a side impact.

According to the invention, this object is achieved by way of an energy store floor system with the features of the independent claims. Advantageous refinements of the invention are the subject matter of the dependent claims.

The energy store floor system according to the invention for an electrically drivable motor vehicle, in particular passenger motor vehicle, comprises a floor structure which has respective side sills and on the lower side of which a store housing of an energy store for an electric drive of the motor vehicle is fastened, and respective profile elements which are arranged along longitudinal sides of the store housing and are fastened on the lower side of the respective assigned side sill.

In order to achieve an improved accident behavior of the energy store floor system, it is provided according to the invention that the profile elements are connected to the respective laterally assigned side sill via respective connecting devices which can be released in the case of an accident-induced relative movement of the respective side sill with respect to the assigned profile element in the vehicle transverse direction from the outside toward the inside. Accordingly, if a movement of the correspondingly affected side sill relative to the laterally assigned profile element in the vehicle transverse direction from the outside toward the inside occurs due to an accident, the elements of the connecting devices arranged in each case on the vehicle body side are released from those which are arranged on the side of the respective profile element after corresponding forces or travels have been exceeded, in order to avoid an excessive intrusion of the profile element into the store housing.

It is to be taken into consideration here that, in the case of a side collision, a load first of all usually acts on the vehicle body including the doors, for example if a pole impact occurs in a region of the vehicle body or the respective side sill which is situated in front of or behind the store housing with the associated profile element. Here, for example, the doors and the vehicle body are in part deformed greatly and, as a result, the respective connecting devices between the laterally affected side sill and the corresponding profile element are also greatly loaded under some circumstances. According to the invention, in the case of a correspondingly high load, accordingly, the profile element on the vehicle side which is affected in the case of the side impact can be disconnected at least partially from the associated side sill, in order to avoid an excessive movement and therefore an intrusion into the store housing of the energy store. As a result, the accident behavior and the safety of the energy store floor system are increased considerably by way of this operation.

In a further refinement of the invention, the respective connecting device is formed by way of an opening in the profile element and a bolt element which penetrates the former and is held on the corresponding side sill, which opening and bolt element can be moved correspondingly with respect to one another in the case of an accident-induced relative movement of the side sill with respect to the profile element. As a result, a particularly simple, respective connecting device is produced.

Furthermore, it has been shown to be advantageous if the profile element is held on the side sill by means of a holding force which is exerted on the profile element by way of the respective bolt element of the connecting device, after the accident-induced exceeding of which holding force the side sill can be moved relative to the assigned profile element in the vehicle transverse direction from the outside toward the inside. Therefore, a limit force or holding force can be set by way of the bolt elements on the part of the side sill, after the accident-induced exceeding of which the side sill carries out a relative movement with respect to the assigned profile element, in order to avoid the profile element penetrating excessively into the store housing.

Furthermore, it has been shown to be advantageous if the opening of the respective connecting device in the profile element widens in cross section from the outside toward the inside in the vehicle transverse direction. As a result, releasing of the respective connecting device in the case of a relative movement of the side sill with respect to the assigned profile element can be achieved in a simple way.

In a further refinement of the invention, the opening of the respective connecting device in the profile element is of at least substantially keyhole-like configuration in cross section and is accordingly configured so as to widen from the outside toward the inside in the vehicle transverse direction in cross section. As a result, the profile element can be released particularly simply from the associated side sill in the region of the respective connecting device.

Furthermore, it is advantageous if, in the course of the accident-induced relative movement of the respective side sill with respect to the assigned profile element in the vehicle transverse direction from the outside toward the inside, the opening and the corresponding bolt element of the corresponding connecting device can be brought out of engagement by way of a relative movement in the vehicle vertical direction. A movement of this type can be produced particularly simply, for example, by way of an opening of keyhole-like configuration on the part of the profile element. Here, the weight of the profile element can be utilized in order that, after a correspondingly large cross-sectional region of the opening is reached, the profile element drops downward in the vehicle vertical direction due to weight and passes out of engagement with the bolt element on the part of the side sill.

Finally, it has been shown to be advantageous if the opening of the respective connecting device in the profile element is configured to be greater in cross section in an inner region than a bolt part of the bolt element. As a result, the opening can be brought out of engagement with the bolt part particularly simply if the inner region of the opening is reached in the case of an accident-induced relative movement of the side sill with respect to the profile element.

Further features of the invention result from the claims, the figures and the description of the figures. The features and combinations of features mentioned above in the description and the features and combinations of features mentioned in the following text in the description of the figures and/or shown in the figures alone can be used not only in the respective specified combination, but rather also in other combinations or on their own.

The invention will now be explained in greater detail on the basis of one preferred exemplary embodiment and with reference to the drawings.

DETAILED DESCRIPTION OF THE DRAWINGS

Figure 1:
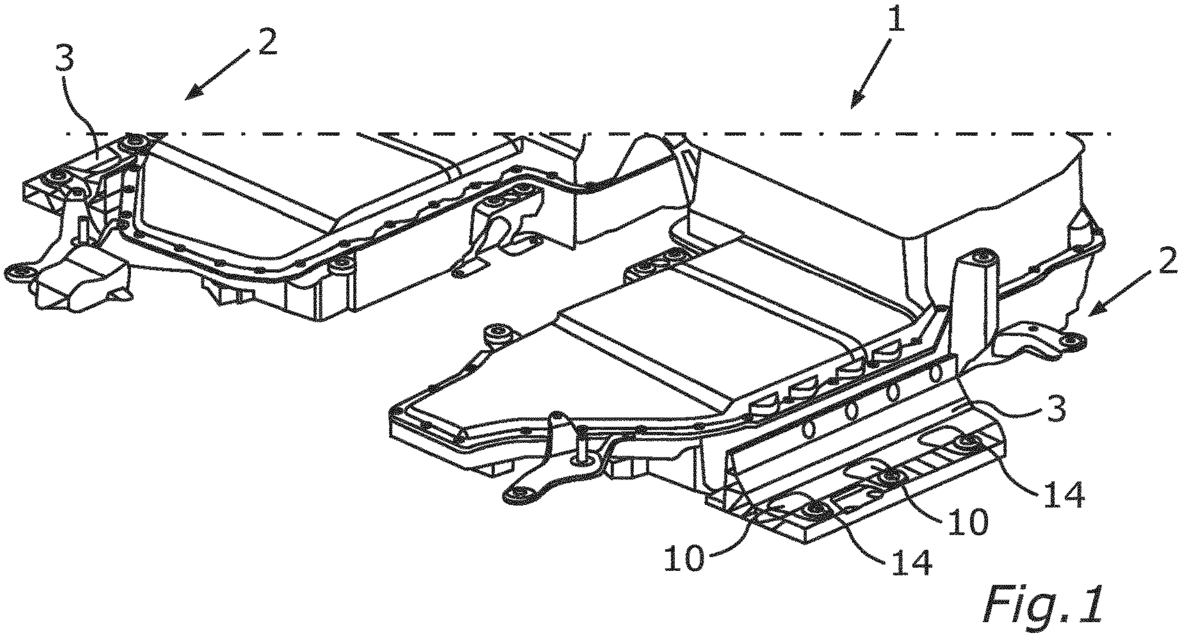
FIG. 1 is a perspective view of a store housing of an energy store for an electric drive of a motor vehicle having respective profile elements which are arranged along longitudinal sides of the store housing.

FIG. 1 shows, in details of a perspective view of an energy store floor system for an electrically drivable motor vehicle, a store housing 1 of an energy store for an electric drive of the vehicle which is also arranged, in a way which will be described in greater detail in the further text, below a floor structure of the body of the motor vehicle. A respective laterally assigned profile element 3 which in the present case is connected, for example, by means of respective bolt connections to the store housing 1, is arranged along the respective longitudinal sides 2 of the store housing 1.

Figure 2:
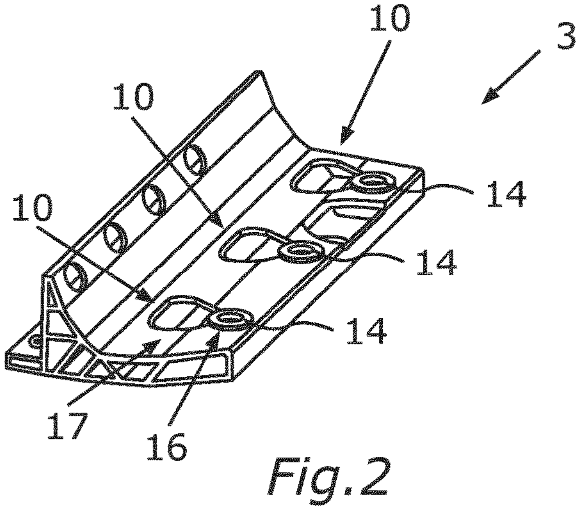
FIG. 2 is a perspective view of one of the profile elements which, according to FIG. 1, is arranged on the corresponding longitudinal side of the store housing.
Figure 3:
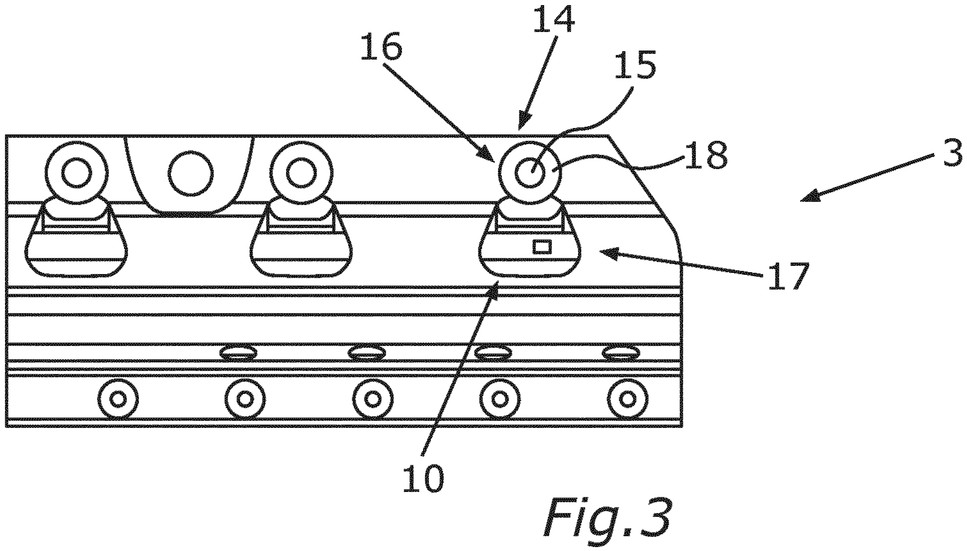
FIG. 3 is a plan view of the profile element according to FIGS. 1 and 2.

This profile element 3 is shown in FIG. 2 in a perspective view and in FIG. 3 in a plan view. In the present case, the profile element 3 is produced, in particular, as an extruded profile or multiple-chamber profile, in particular from an aluminum alloy. Other embodiments of the profile element 3 would of course also be possible.

Figure 4:
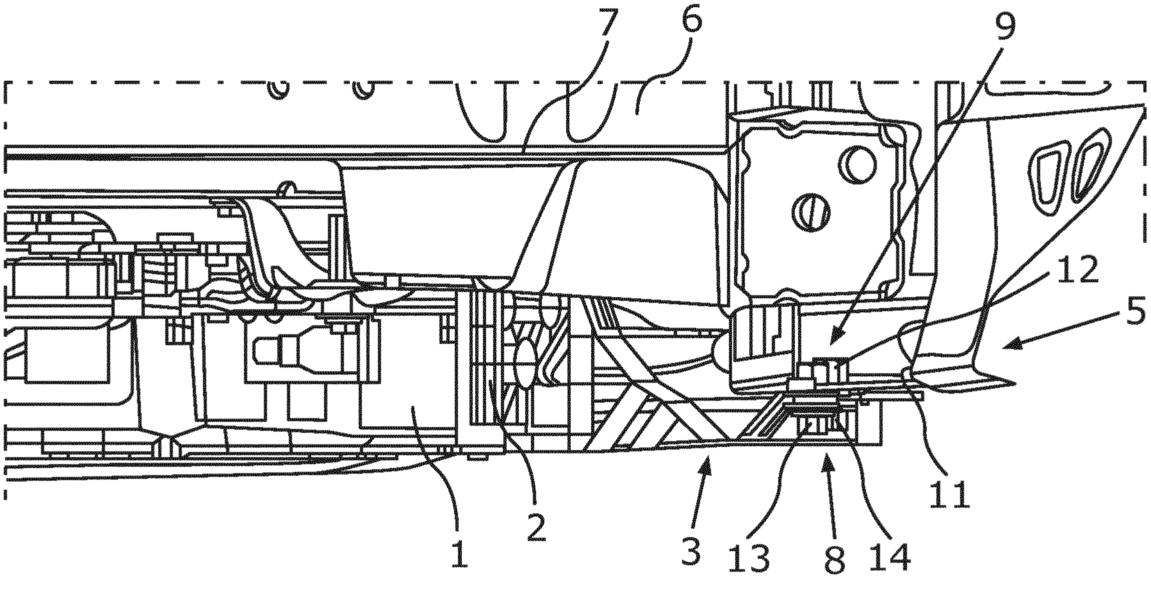
FIG. 4 is a perspective sectional view through the energy store floor system along a sectional plane, running in the vehicle transverse direction and in the vehicle vertical direction, in the region of one of the profile elements which is arranged along the corresponding longitudinal side of the store housing and is fastened on the lower side of the laterally assigned side sill.

FIG. 4 shows, in details of a perspective sectional view of a sectional plane which runs in the vehicle transverse direction and in the vehicle vertical direction, the energy store floor system, in the case of which the store housing 1 which is shown according to FIG. 1 is arranged on the lower side of a floor structure of the motor vehicle body which comprises respective side sills 5 which run on the vehicle outer sides and between which respective cross members 6 and a vehicle floor 7 or a floor panel extend. Here, the store housing 1 is fastened, inter alia, by means of the respective laterally associated profile elements 3 on the lower side of the respective laterally assigned side sill 5 via respective connecting devices 8.

These connecting devices 8, of which three are provided per lateral profile element 3 in the present case, in each case comprise a bolt element 9 which is held on the part of the corresponding side sill 5 and penetrates a corresponding opening 10 in an upper flange 11 of the profile element 3. Here, the bolt elements 9 comprise respective bolts 12 and bolt heads 13, between which a bush 14 is arranged. This bush 14 can also be seen in the profile elements 3 according to FIGS. 1 to 3. Here, the bushes 14 are adapted with an inner cross section 15 to an outer cross section 16 of the respective opening 10 within the profile element 3. In the present case, this outer cross section 16 is configured, for example, as a slot.

As can be seen, in particular, from FIGS. 1 to 3, the respective opening 10 in the profile element 3 widens from the outer cross section 16 in the vehicle transverse direction toward the inside to an inner cross section 17, in the manner of a keyhole. More precisely, the opening 10 increases from the outer cross section 16 toward the inner cross section 17 in such a way that the inner cross section 17 is of larger configuration than an outer circumference of the bush 14 of the respective bolt element 9. While an outer collar 18 of the respective bush 14 is accordingly supported by the corresponding upper flange 11 of the profile element 3 in its position which is shown in FIGS. 1 to 3 and in which it lies in congruence with the outer cross section 16 of the opening 10, the respective opening 10 in the inner cross section 17 is increased in such a way that the collar 18 of the bush 14 can no longer be supported.

Accordingly, the stated connecting device 8 brings about a connection of the respective profile element 3 to the laterally assigned side sill 5 which can be released in the case of an accident-induced relative movement of the respective side sill 5 with respect to the assigned profile element 3 in the vehicle transverse direction from the outside toward the inside.

Figure 5A:
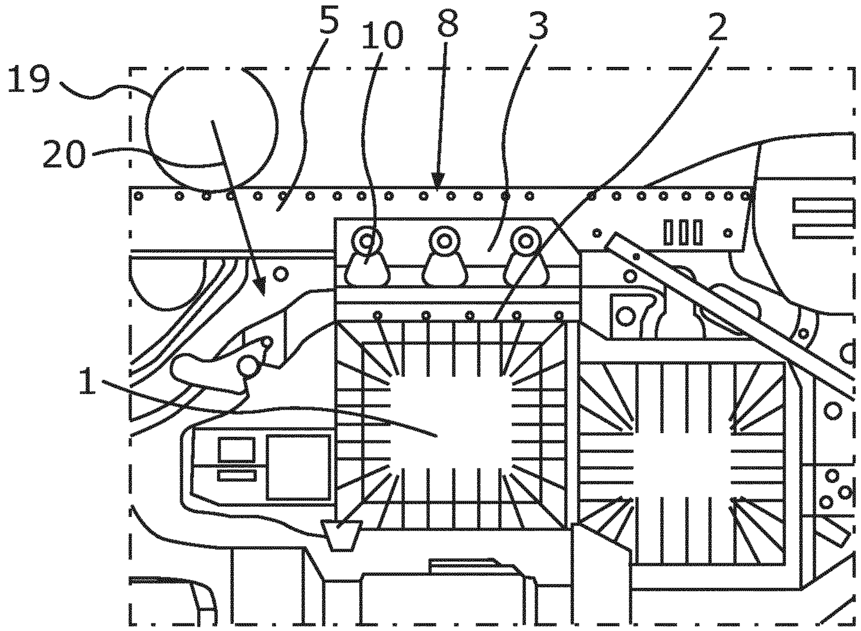
FIGS. 5*a* and 5*b* show details of a respective bottom view of the energy store floor system according to an embodiment of the invention before (FIG. 5*a*) and during (FIG. 5*b*) a side impact of a pole with the laterally corresponding side sill in a longitudinal region in front of the assigned profile element of the store housing, as a result of which an accident-induced relative movement of the side sill with respect to the corresponding profile element in the vehicle transverse direction from the outside toward the inside is produced, which relative movement causes releasing of the corresponding connecting device in the vicinity of the pole impact.
Figure 5B:
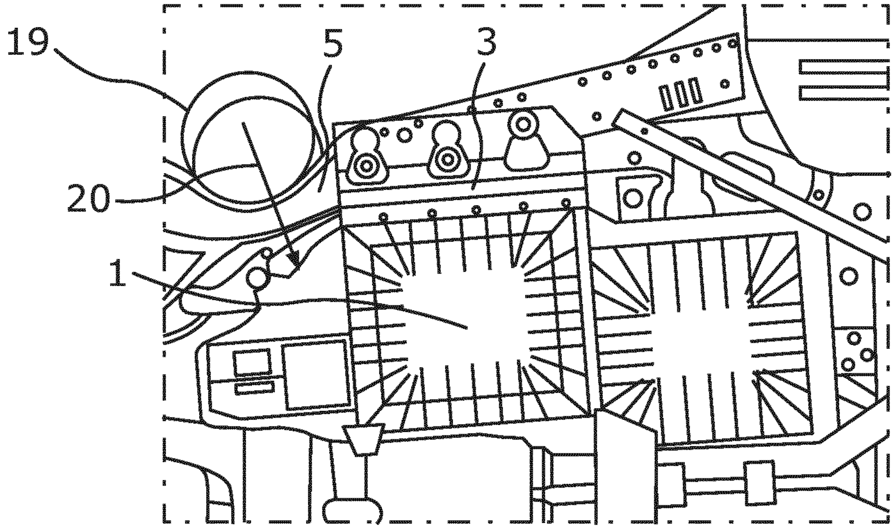

A relative movement of this type of the respective side sill 5 with respect to the assigned profile element 3 results, for example, in the case of a side impact of a pole 19, as can be seen in combination with FIGS. 5*a* and 5*b*. Here, details of a respective bottom view show the energy store floor system with the store housing 1 which is fastened on the lower side of the respective laterally assigned side sill 5 via the respective profile element 3. If, as can be seen from FIG. 5*a*, a side impact with the pole 19 then occurs, the force (arrow 20) which is introduced by way of the pole 19 brings about a corresponding deformation and intrusion of the pole 19 into the motor vehicle body in the region of the side sill 5 in front of the profile element 3, with the result that it is first of all not yet loaded directly. Here, the intrusion of the pole 10 becomes clear from FIG. 5*b*.

As a consequence of this intrusion of the pole 19 into the motor vehicle body in the region of the side sill 5, a relative movement between this side sill 5 and the laterally assigned profile element 3 in the vehicle transverse direction from the outside toward the inside occurs. In order to avoid here, for example, that the profile element 3 moves excessively in the direction of the store housing 1 in the vehicle transverse direction inward and intrudes into the store housing 1 with an amount of energy which is so high that, for example, the energy store is damaged and a thermal event is produced, at least the connecting device 8 in the vicinity of the impact of the pole 19 is released in the present case.

Here, the profile element 3 is first of all fixed on the laterally associated side sill 5 via the respective connecting device 8 with a holding force which is brought about by way of the corresponding bolt element 9, with the result that the bolt elements 9 and the associated bushes 14 are held in the position which is shown in FIGS. 1 to 5*a*. If this holding force is exceeded as a consequence of the relative movement of the side sill 5 with respect to the profile element 3 in the vehicle transverse direction toward the inside, the respective bolt element 9 is moved with the associated bush 14 out of the position shown in FIGS. 1 to 5*a* in the vehicle transverse direction inward relative to the opening 10, with the result that the corresponding bolt element 9 and its bush 14 pass into the inner cross-sectional region 17 of the respective opening 10, in which the bush 14 and the associated bolt element 9 pass out of engagement with the opening 10.

Figure 6:
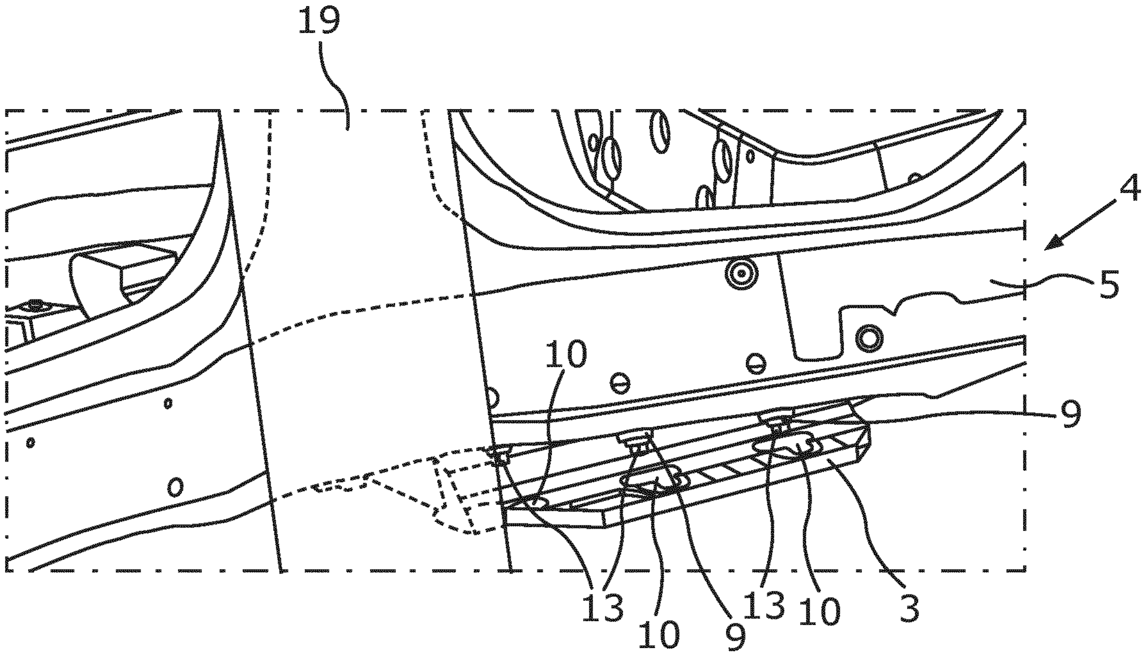
FIG. 6 shows details of a perspective view laterally from the outside of the energy store floor system in the region of the side sill which is affected during the pole impact and, as a consequence of its relative movement with respect to the corresponding profile element, is released from the profile element at the corresponding connecting devices and has passed out of engagement, as a result of which an excessive movement of the profile element in the direction of the store housing is avoided.

As soon as the bolt element 9 with the bush 14 passes into the region of the inner cross section 17 of the corresponding opening 10 as a consequence of the relative movement between the side sill 5 and the profile element 3, the bolt element 9 with the bush 14 passes out of engagement with the opening 10 and, as a consequence of the weight, passes by way of a relative movement in the vehicle vertical direction into the position which is shown in FIG. 6, in which the profile element has been released from the corresponding side sill 5 as a result of releasing of the connecting devices 8 in the case of the corresponding pole impact. It is achieved here as a result that, in the event of a correspondingly large relative movement of the side sill 5, the profile element 3 is not moved via the respective connecting devices 8 with the latter and therefore excessively in the vehicle transverse direction inward, but rather the corresponding connecting devices 8 are released, with the result that an excessive intrusion on the longitudinal sides 2 of the store housing 1 cannot occur. As a result, inter alia, serious damage of the store housing 1 which can lead, for example, to a thermal event is effectively avoided.

Overall, it can therefore be seen that, in the present case, the corresponding profile element 3 and therefore the store housing 1 are held on the corresponding side sill 5 with a defined holding force which can be determined by way of the respective bolt element 9 of the connecting device 8, the respective connecting device 8 first of all being released in the case of a corresponding accident-induced force load and an associated relative movement of the side sill 5 with respect to the profile element 3, by the respective bolt element 9 with the associated bush 14 moving out of the outer cross section 16 of the opening 10 in the direction of the inner cross section 17. When this inner cross section 17 of the opening 10 is reached, the bolt element 9 with the bush 14 passes out of engagement with the respective opening 10 within the profile element 3, with the result that the weight of the profile element 3 brings it about, moreover, that the respective bolt element 9 with the bush 14 and the corresponding opening 10 within the profile element 3 pass out of engagement, and therefore the connecting devices 8 are released.

LIST OF DESIGNATIONS

1 Store housing
2 Longitudinal sides
3 Profile element
4 Floor structure
5 Side sill
6 Crossmember
7 Vehicle floor
8 Connecting device
9 Bolt element
10 Opening
11 Upper flange
12 Bolt
13 Bolt heads
14 Bush
15 Inner cross section
16 Outer cross section
17 Inner cross section
18 Collar
19 Pole
20 Arrow

What is claimed is:

1. An energy store floor system for an electrically drivable motor vehicle, comprising:

a floor structure having respective lateral side sills, to an underside of which is fastened a store housing of an energy store for an electric drive of the motor vehicle, and having respective profile elements which are arranged along longitudinal sides of the store housing and are fastened on the underside of a respectively assigned lateral side sill, wherein the profile elements are connected to the respectively assigned lateral side sill via respective connecting devices which are non-breakably detachable in case of an accident-induced relative movement of the respective side sill with respect to the assigned profile element in a vehicle transverse direction from outside inward that exceeds a defined holding force of a respective connecting device.

2. The energy store floor system according to claim 1, wherein the respective connecting device is formed by way of an opening in the profile element and a bolt which penetrates the opening and is held on the corresponding side sill.

3. The energy store floor system according to claim 2, wherein the profile element is held on the side sill by the defined holding force which is exerted on the profile element by way of the respective bolt of the connecting device, after the accident-induced exceeding of which holding force the side sill is movable relative to the assigned profile element in the vehicle transverse direction from the outside inward.

4. The energy store floor system according to claim 2, wherein the opening of the respective connecting device in the profile element widens in cross section from the outside inward in the vehicle transverse direction.

5. The energy store floor system according to claim 2, wherein the opening of the respective connecting device in the profile element has a keyhole-shaped configuration in cross section.

6. The energy store floor system according to claim 2, wherein in the course of the accident-induced relative movement of the respective side sill with respect to the assigned profile element in the vehicle transverse direction from the outside inward, the opening and the corresponding bolt of the corresponding connecting device are brought out of engagement by way of a relative movement in a vehicle vertical direction due to a weight of the profile element, wherein the corresponding bolt remains on the side sill.

7. The energy store floor system according to claim 2, wherein the opening of the respective connecting device in the profile element is configured to be greater in cross section in an inner cross section than a portion of the bolt.

* * * * *